United States Patent [19]

Titherley

[11] Patent Number: 4,489,414
[45] Date of Patent: Dec. 18, 1984

[54] COMPUTER PERIPHERAL TESTING EQUIPMENT

[75] Inventor: Robert H. Titherley, Weybridge, England

[73] Assignee: Hal Computers Limited, Surrey, England

[21] Appl. No.: 316,047

[22] Filed: Oct. 28, 1981

[51] Int. Cl.³ .............................................. G06F 11/22
[52] U.S. Cl. ........................................ 371/20; 371/15; 324/73 R
[58] Field of Search ................. 371/20, 15; 324/73 R, 324/73 AT; 179/175; 364/200, 900

[56] References Cited

U.S. PATENT DOCUMENTS

| | | | |
|---|---|---|---|
| 3,710,350 | 1/1973 | Yoshitake | 371/20 |
| 3,711,691 | 1/1973 | Breitenbach | 371/20 |
| 4,108,358 | 8/1978 | Niemaszyk | 371/20 |
| 4,168,527 | 9/1979 | Winkler | 364/580 |
| 4,291,404 | 11/1979 | Steiner | 371/20 |
| 4,380,070 | 4/1983 | Steiner | 371/20 |

FOREIGN PATENT DOCUMENTS

| | | | |
|---|---|---|---|
| 2631483 | 1/1978 | Fed. Rep. of Germany | 371/20 |
| 2019011A | 10/1979 | United Kingdom | 371/20 |

OTHER PUBLICATIONS

Computer Design, vol. 16, No. 9, Sep. 1977, pp. 105-111, Concord J. S. Neese: Microprocessor System Validation and Failure.
"Functional Data Modules Let IC Tester Examine all μP's and Related LSI", EDN, (USA), vol. 22, No. 6, Mar. 20, 1977.
Ahonen et al., "Microprocessor-Controlled Power Supply Tester", IBM Technical Disclosure Bulletin, vol. 23, No. 4, Sep. 1980.

Primary Examiner—Jerry Smith
Assistant Examiner—Michael R. Fleming
Attorney, Agent, or Firm—Armstrong, Nikaido, Marmelstein & Kubovcik

[57] ABSTRACT

Equipment for testing computer peripherals is disclosed having a computer, with keyboard and display, for coupling to such peripherals by way of a peripheral connector, the computer being provided with software defining test and exercising routines for operating a peripheral device in a controlled and monitorable manner. The computer has a central processor coupled to a bus system to which is connected a monitor, inter alia defining key functions of the keyboard. The bus system also is connected by way of the peripheral connector to an interface to interface between the computer and various peripheral devices. The computer is a portable microprocessor system provided with plug-in modules containing the software as firmware to define the test and exercising routines required for different peripheral devices. The software defines different peripheral connector configurations applicable to the different peripheral devices concerned and also different key functions for operator control of the test and exercising routines.

7 Claims, 3 Drawing Figures

COMPUTER PERIPHERAL TESTING EQUIPMENT

BACKGROUND OF THE INVENTION

This invention relates to computer peripheral testing equipment.

Conventional computer peripheral testing equipment normally involves the host computer or test means internally of the peripheral equipment or dedicated logic circuitry specific to only one type of peripheral. In the first case, test software is provided for the host computer which provides a sequence of tests normally under control of the user. Any defect in the host computer can affect results, so that this does not always provide a reliable test method. In the second case, interface circuitry in the peripheral will not normally be incorporated in the test so that a defect there will not be directly exposed. In the third case, there is lack of flexibility.

U.K. patent specification No. 1356324, for an Electronic Circuit Tester, discloses a special purpose electronic circuit tester comprising a programmable computer containing a test pattern. This is a chip tester to allow individual chips in a memory array to be tested. It is not designed for testing peripherals.

U.K. patent specification No. 1328978 discloses electronic unit testing equipment for use with a computer to provide a system for testing printed circuit cards by applying stimulus to a board in a manner controlled by the computer and by comparing the results with a stored norm. Computer peripherals as such do not in general seem to be catered for by this equipment. Thus, it not only suffers from the disadvantage mentioned above of requiring a host computer but also it seems not to be designed to test *and* exercise a variety of peripherals as such.

U.K. patent specification No. 1403710 discloses a general purpose computer which is not designed for peripheral testing as such but which can have self-diagnosis and, like other general computers, can be coupled to operate a variety of peripherals via respective dedicated input/output connectors.

The programming of the computer may be altered by changing plug-in program modules which can alter the functions of keys of a keyboard of the computer e.g. to give different typewriter functions. The computer, being general purpose, is somewhat expensive and unwieldy for use as an engineer's diagnostic tool and, indeed, is not designed as such.

It is an object of the invention to provide a self-contained, portable, engineer's diagnostic tool by which computer peripherals can be tested and exercised independently of their host computer.

SUMMARY OF THE INVENTION

According to the invention, there is provided computer peripheral testing equipment comprising, in combination, (a) a self-contained, portable, special-purpose microprocessor system, (b) a plug-in firmware module for releasable plug-in connection with the system and containing firmware defining peripheral test and exercising routines, and (c) a plug-in input/output module, for releasably coupling a computer peripheral to said system, that is an interface circuit including line drivers, the system comprising: a first connector for receiving said input/output module and having a plurality of contacts for electrically contacting said input/output module; a keyboard; a microprocessor; a monitor; and a second connector for receiving said plug-in firmware module, the monitor comprising means for assigning functions to a first portion of the keyboard, and said firmware module comprising means for assigning functions to a further portion of the keyboard for use in the execution of the firmware testing and exercising routines and said firmware module also providing means for configuring contacts of the first connector such that some of said contacts provide for input and others for output, the functions of the keyboard, the configuration of the first connector and the form of testing and exercising being dependent upon said firmware module which can be interchanged to alter the purpose of the equipment.

The equipment is thus a dedicated computer enabling computer peripherals to be tested independently of their host computer by a hand-carried device which would form part of a maintenance engineer's equipment. By exchanging the plug-in modules a variety of peripherals can be tested by test and exercising routines particularly adapted to the peripheral concerned.

The or each plug-in firmware module will incorporate monitor routines defining keyboard functions so that operator intervention can be made specific to each module. Display means may be provided to display data defined by the monitor and the firmware to provide operator guidance during operation.

The firmware modules will also incorporate routines in order to configure the peripheral connector contacts according to the required functions for the operation concerned, e.g. configuring certain connections for output and leaving others configured for input.

A preferred embodiment is designed so as to make it as simple and as cheap as possible in the sense that many features of existing microprocessor systems which are irrelevant to peripheral testing and exercising are omitted. Thus, for example, no facilities are provided for programming the system via the keyboard. All programming is contained in the monitor and in the plug-in test modules. It will be apparent that such portable microprocessor system is effectively inoperable as a computer system in the absence of the plug-in firmware module.

A preferred embodiment, therefore, consists in essence merely of: a microprocessor chip; a keyboard and display control chip; buffers for the plug-in firmware module; the monitor; and memory and input-output ports associated with the connector for the peripheral under test, these items all being interconnected by an address-data-control bus. Drivers between the bus and ports will be omitted as these are in the plug-in input/output module.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION OF AN EMBODIMENT OF THE INVENTION

Figure 1:
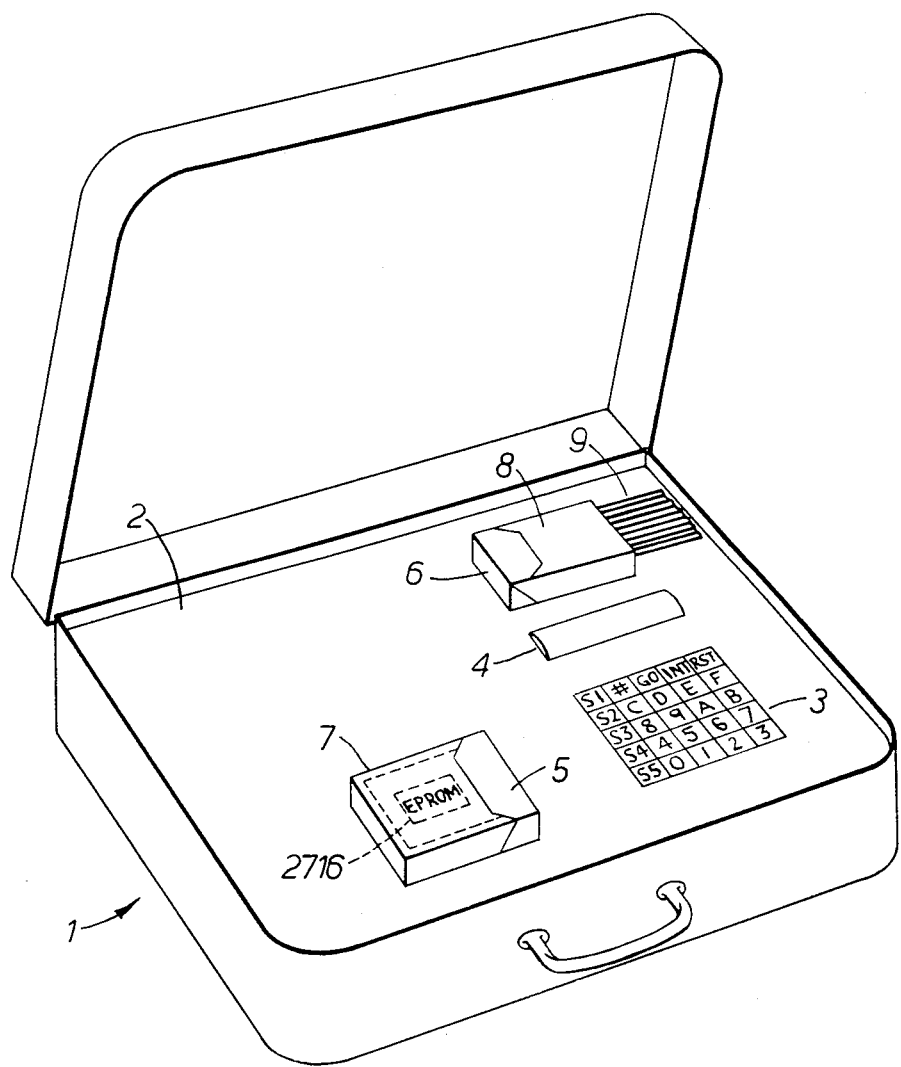
FIG. 1 is a perspective view of computer periperal test equipment.

FIG. 1 shows in perspective self-contained, special-purpose, computer peripheral test equipment which is contained in a portable case 1 supporting within it a front panel 2 below which is mounted a microprocessor system to be described hereinafter. The front panel 2 carries a keyboard 3 incorporating a hexadecimal set of keys together with nine further keys which are as follows: a #-key which is a data entry or "return" key; a RST-key for reset purposes; an INT-key to implement an interrupt; a GO-key and five further variable function keys S1, S2, S3, S4 and S5.

The panel 2 also supports a display 4 and two printed circuit board connectors 5 and 6 which are mounted within the protective covers which are visible in FIG. 1. A plug-in module 7 is releasably attached to the connector 5 as shown in FIG. 1, and an interface module 8 is releasably attached to the connector 6. Extending from the interface module 8 is a strip connector 9 which extends to a peripheral under test (not shown).

Figure 2:
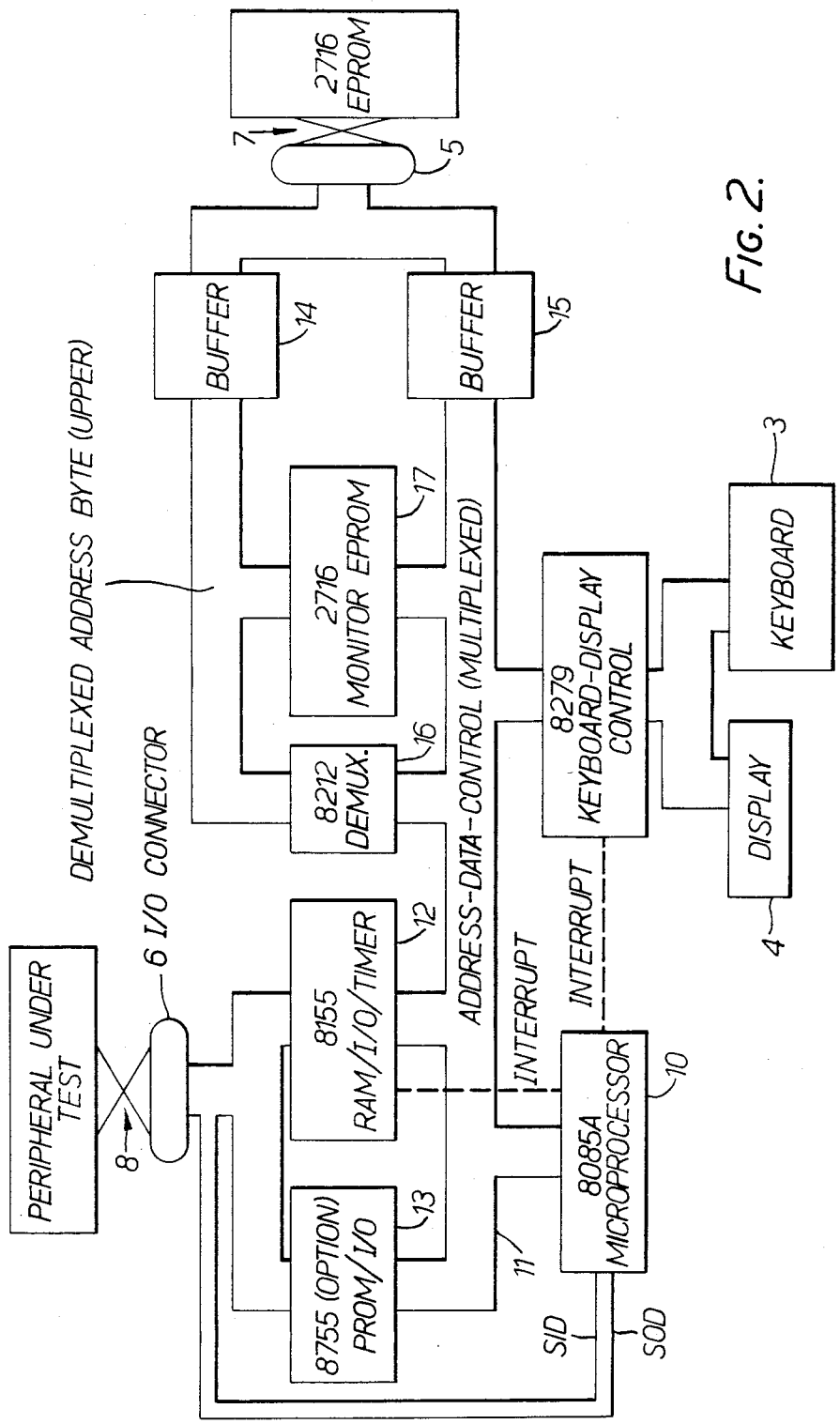
FIG. 2 is a schematic diagram of a microprocessor system incorporated in the test equipment.

FIG. 2 is a schematic block diagram of the microprocessor system and shows the items 3, 4, 5 and 6 already mentioned with reference to FIG. 1. The microprocessor system has as its fundamental item a microprocessor chip of type 8085A which is an eight-bit processor using multiplexed address and data lines. This microprocessor chip is designated 10 in FIG. 2. Extending from the microprocessor is an address-data-control bus 11. Serial input and output lines (SID and SOD) also extend from the microprocessor chip to the connector 6.

The connector 6 is otherwise connected to the microprocessor via the bus 11 and an 8155 device 12 which is a static read-write memory with input/output ports and a timer. This device 12 acts as a bufier for the connector 6 and provides input and output ports therefor together with a timer for providing a timed interrupt at the TRAP input of the microprocessor.

FIG. 2 shows additional input/output ports and memory for the connector 6 provided by a device 13 which is an 8755 chip, which is an erasible programmable read only memory with two 8-bit input/output ports. Note that chips 12 and 13 are connected directly, without line drivers, to connector 6, so that chips 12 and 13 would not be able to drive most peripherals by themselves.

The connector 5 is connected to the microprocessor by way of the bus 11 together with buffers 14 and 15 (device 14 being provided by an 8212 chip which receives the upper address byte, and the buffer 15 being provided by a device 8212 for control signals on the control part of the bus and two bidirectional bus drivers of type 8216). The buffer 14 is coupled to the bus 11 by way of a demultiplexer circuit 16 of type 8212. Finally, FIG. 2 shows the monitor itself which is an EPROM chip 17 of type 2716.

The details of the construction of such a system will be clear to those skilled in the art from this description of FIG. 2, with reference to the book "An Introduction to Microcomputers" Volume 3 by Adam Osborne et al as published by Adam Osborne & Associates Incorporated. Chapter 5 of that book is particularly relevant to the preferred embodiment.

The plug-in module 7 is not shown in any further detail in the figures because it consists merely of the casing shown in FIG. 1 which contains a printed circuit board having an edge provided with a series of contacts for the connector 5, these contacts being connected to the pins of an EPROM chip 2716 containing firmware incorporating monitor routines and either test and peripheral exercising routines or self-diagnostic routines for the equipment.

Figure 3:
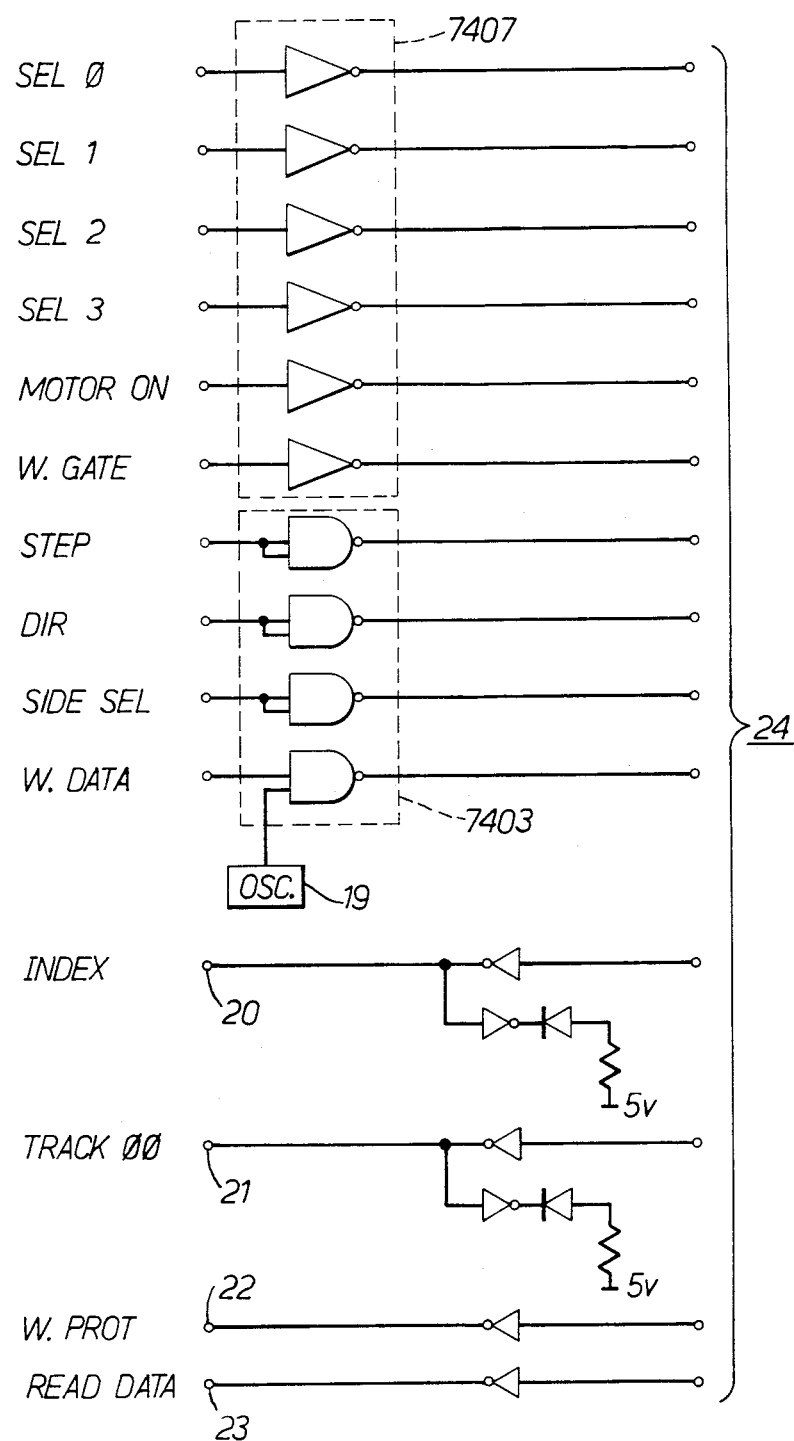
FIG. 3 is a circuit diagram of an interface board.

The interface module 8 similarly comprises a casing incorporating a printed circuit board provided with edge contacts for connection to the connector 6. FIG. 3 shows an example of the circuitry of such an interface module, in this case adapted for connection to a 5¼ inch mini-floppy disc drive. The circuit of FIG. 3 has ten inputs providing four track selection inputs, a motor-on input, a write gate input, a stepping input, a direction input, a side selection input, and a write data input. Nine of the ten inputs connect to inverters in the module whilst the write data input connects to a gate to which an oscillator 19 is also connected. Four outputs are provided from the circuit for supply to the microprocessor system via amplifiers, these outputs being an index output 20, a track zero output 21, a write protect signal output 22 and a read-data output 23. FIG. 3 also shows the connections 24 on one edge of the interface board which connect to the cable 9 shown in FIG. 1.

The monitor 17 contains firmware which assigns functions to all the keys apart from S1 to S5 and which, on applying power to the system, configures the circuits 12 and 13 so that all their ports are defined as input ports. The monitor then provides a waiting state in which it is responsive only to the go-key. At this time the modules 7 and 8 should have been plugged into the respective connectors 5 and 6. When the go-key is actuated, the monitor causes the module 7 to be addressed to access an initialising routine which causes specific ports of the devices 12 and 13 to be reconfigured as output ports, leaving the remaining ports configured as input ports. Without module 7, the system is inoperable.

It will be assumed in the remainder of the description that the module 7 selected is one designed to test and exercise a 5¼ mini-floppy disc drive.

Having initialised the input and output ports, such a module will then provide a signal which will be directed to the connector 6 to start the disc drive motor. This is followed by a one second waiting period before the next routine is called.

The next routine accessed from the module causes, in this example, the display of the letters "tr" on a display to signify that the operator should input the number of tracks which the particular disc drive is intended for. This number will be input via the hexadecimal keyboard and terminated by the # sign-key. A further routine from the module will then be accessed causing the display to change to the letters "St", awaiting an operator response which is the input of the step speed in milliseconds of the disc drive concerned. On receiving a valid input, the next-accessed routine from the module will be that displaying the letters "Prog" and causing the system to await the desired test program number, which in the present example may be 1, 2 or 3. When the number has been entered it is validated and appropriate routines are called from the module depending upon the selection, selection 1 initiating a general stepping test, 2 iniating a speed check and 3 initiating a continuous stepping exercising operation.

The general stepping operation will now be considered.

The first operation of the general stepping routine is to display "dr" in order to prompt the operator to input the required drive identification number, bearing in mind that several daisy-chained drives may be coupled to the test equipment. The next routine constitutes a test loop which continually monitors signals from the disc drive until it has ascertained that the drive selected is ready for testing with its head at track zero.

The drive status is then displayed on the display 4 and the system waits for operator actuation of keys S1 to S5.

The status is displayed by giving the drive number concerned, the track number, the side number and the status such as "R" for read, "E" for error and "P" for write protected. At this point keyboard monitor routines in the module 7 allocate specific functions to the keys S1 to S5.

In this example, actuation of key S1 will ask for the input of a specific track number and the drive will step to that track and then return to the routine which outputs the drive status and awaits a further key operation. Key S2 causes the drive to be recalibrated and will return to the initial state waiting for the go-key. Key S3 causes an output to initiate writing a "1F" pattern over the disc and will then return to the routine which outputs the drive status. Actuation of key S4 is similar to that of S3 except the pattern written is "2F". Key S5 provides an output to put the drive into a condition for reading data.

The second set of selectable program routines is one for speed checking and requires the operator to input the drive number. The selected drive then has its speed measured (index pulses from the drive are timed) and the display displays the highest and lowest values.

The third set of selectable routines provides for drive exercising by continuous stepping. The operator inputs the drive number and the starting and final tracks (which are displayed) and the module routines then continually step the drive back and forwards between the two tracks.

Other modules will provide similar routines for testing and exercising other periphals, such as printers and other types of drives.

The RST-key is scanned by the monitor and, on actuation, the system returns to its initial state by way of a hardware reset.

The INT-key initiates a jump to the previous input routine. Any data validation errors are displayed and key "C" will clear the error.

Finally, it is to be noted that one form of firmware module 7 provides test and exercising routines for a Winchester-type disc drive. In order to provide for this type of drive, the interface module is designed to be connected, externally of the test equipment, to a power supply unit and controller for the disc drive. In this case, the power supply unit and controller are additional to the requirements for most peripherals.

I claim:

1. Testing equipment for testing computer peripherals, comprising, in combination, a portable case having operator panel means and containing a microprocessor system, a plug-in firmware module for releasable plug-in connection with the system and containing firmware constituting peripheral test and exercising programming routines, and a plug-in input/output module providing an interface circuit including line drivers for releasably coupling a computer peripheral to said system, the system comprising:
   a first connector available to the operator at said panel means for receiving said input/output module and said first connector having a plurality of contacts for electrically contacting said input/output module;
   a keyboard on said operator panel means;
   a monitor in said case storing monitor routines;
   a second connector available to the operator at said panel means for releasably receiving and electrically connecting to said plug-in firmware module;
   a microprocessor in said case; and
   an address, data and control bus also in said case and coupling said microprocessor to said first connector, to said monitor, to said keyboard and to said second connector to enable said microprocessor to read and execute the test and exercising routines from said firmware module under control of said keyboard and microprocessor, and to enable said microprocessor to create output signals for, and read input signals from, the peripheral via said second connector in consequence of the execution of said routines;
   said firmware module comprising instructions for assigning functions to a portion of the keyboard for use in the execution of the firmware testing and exercising routines under control of said portion of the keyboard, and said firmware module also providing instructions for configuring contacts of the first connector such that some of said contacts provide for input from and others for output to said bus, the functions of said portion of the keyboard, the configuration of the first connector and the form of testing and exercising being dependent upon said firmware module which can be interchanged, as can said input/output module, to adapt the equipment to a range of computer peripherals.

2. Equipment as claimed in claim 1, wherein said microprocessor system additionally comprises a display at said panel means and coupled to the bus for displaying data under control of the microprocessor and in response to routines of said firmware module.

3. Equipment as claimed in claim 2, wherein the monitor provides program routines for preparing the microprocessor system for use on applying power to the system, and for preventing further use of the system by an operator until an appropriate plug-in firmware module is connected to the second connector.

4. Equipment as claimed in claim 2, wherein the firmware module comprises a read-only-memory containing said firmware.

5. Equipment as claimed in claim 1, wherein the bus is coupled to a configurable input/output port device providing configurable ports connected to the contacts of said first connector.

6. Equipment as claimed in claim 2 and comprising, connected to the input/output module, a power supply unit and disc controller both for operating a Winchester-type disc drive as a computer peripheral under test.

7. Test and exercising equipment for testing and exercising computer peripheral devices, the equipment comprising a portable case having an operator panel and containing:
   a microprocessor;
   a bus coupled to the microprocessor to provide address and data communication between the bus and microprocessor;
   an input/output device coupled to the bus and having configurable ports for receiving and emitting data under microprocessor control;
   a first connector at said operator panel and having contacts for releasable connection to an input/output interface for a peripheral device and said contacts being connected to said ports for signal exchange between the peripheral device and the microprocessor by way of the bus;

a second connector at said operator panel for releasably receiving a plug-in firmware module and coupled to the bus in order to couple the module to said microprocessor via said bus;

a keyboard on said operator panel and coupled to said bus;

a display mounted on the operator panel and coupled to said bus; and a monitor coupled to the bus and containing program routines to cause the microprocessor to act on the application of power to the system for accessing, via said bus and said second connector, software routines of said firmware module for configuring ports of said input/output device, for defining functions for a portion of the keyboard, providing peripheral tests and exercises, and for operating said display to provide an indication of the progress of said tests and exercises;

said equipment further comprising at least one input/output interface for releasable-connection to said first connector and comprising interface means for interfacing a computer peripheral with said bus; and at least one firmware module for releasable connection to said second connector and comprising Read-Only-Memory containing said software routines.

* * * * *